United States Patent [19]

Bailey, Jr., deceased et al.

[11] Patent Number: 5,200,434

[45] Date of Patent: Apr. 6, 1993

[54] AMIDE DERIVATIVES OF ALKYLENE OXIDE POLYETHERS AND THEIR USES IN POLYURETHANE FOAM MANUFACTURE

[75] Inventors: Frederick E. Bailey, Jr., deceased, late of Charleston, by Mary C. L. Bailey, executrix; Harry R. Hinney, Cross Lanes, both of W. Va.; Paul L. Matlock, Ossining, N.Y.; Reinhart Schiffauer, Cross Lanes, W. Va.

[73] Assignee: Union Carbide Chemicals & Plastics Technology Corporation, Danbury, Conn.

[21] Appl. No.: 815,827

[22] Filed: Dec. 30, 1991

[51] Int. Cl.$^5$ .............................. C08G 18/00; C08J 9/00
[52] U.S. Cl. ........................................ 521/129; 521/155
[58] Field of Search ............................... 521/129, 155

[56] References Cited

U.S. PATENT DOCUMENTS

| | | | |
|---|---|---|---|
| 3,383,351 | 5/1968 | Stamberger | 260/33.2 |
| 3,418,354 | 12/1968 | Wheeler et al. | 260/448.2 |
| 3,823,201 | 7/1974 | Pizzini et al. | 260/861 |
| 3,891,584 | 6/1975 | Ray-Chaudhuri et al. | 260/27 R |
| 3,953,393 | 4/1976 | Ramlow et al. | 260/31.8 R |
| 4,528,334 | 7/1985 | Knopf et al. | 525/404 |
| 4,652,589 | 3/1987 | Simroth et al. | 521/137 |
| 4,686,240 | 8/1987 | Bailey, Jr. et al. | 521/103 |
| 4,701,474 | 10/1987 | Bailey, Jr. et al. | 521/137 |
| 4,704,410 | 11/1987 | Booth et al. | 521/166 |
| 4,963,637 | 10/1990 | Barksby | 528/59 |

Primary Examiner—Morton Foelak
Attorney, Agent, or Firm—W. F. Gray

[57] ABSTRACT

Amine-containing amide derivatives of polyethers, and the use of such materials as catalysts in manufacture of polyurethane foam. The derivatives may be represented by the general formula

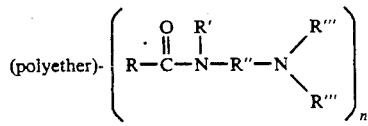

wherein: R is $CH_2$ when the amino-amide-containing moiety is located on an end of polyether chain, and is $C_2H_4$ or $CH_2CH(CH_3)$ when the aminoamide-containing moiety is located along a polyether chain; R' is H, an alkyl group of 2–4 carbon atoms, or R''—N(R''')$_2$; R'' is alkylene of 2–6 carbon atoms, phenylene, or $C_2H_4N(CH_3)C_2H_4$; R''' groups individually are alkyl groups of 1–18 carbon atoms or phenyl, or the R''' groups on a given nitrogen atom are 2-carbon alkylene moieties joined together by a divalent linking atom X to form a six-membered ring wherein X is —O— or >N—R*, and R* is H or an alkyl group of 1–18 carbon atoms; and n is 1–6.

8 Claims, No Drawings

AMIDE DERIVATIVES OF ALKYLENE OXIDE POLYETHERS AND THEIR USES IN POLYURETHANE FOAM MANUFACTURE

FIELD OF THE INVENTION

This invention relates to urethane foams, and more particularly, to amine-containing amide derivatives of polyethers for use in the manufacture of such foams.

BACKGROUND OF THE INVENTION

Amine catalysts are generally employed in the manufacture of polyurethane foam to catalyze the reaction between a polyisocyanate and a polyol to form the urethane linkages. Use of these somewhat volatile materials can cause such problems for workers as corneal edema or "blue haze", especially when improper ventilation is employed in foam processing. The problem of "blue haze" has also been experienced during amine manufacture. In addition, residual amines in foams have been associated with a yellow staining of workers' hands in some post-foaming processing operations, and there are also recurring concerns about residual amines contributing to odor in foams. Accordingly, it would be desirable to have amine catalysts in which the amines are substantially nonvolatile, and which still possess the required catalytic activity.

Another class of additives used in polyurethane foam manufacture is the acid-containing polyethers. Carboxylated polyethers have been prepared by grafting unsaturated carboxylic acids such as acrylic or methacrylic acid onto polymers and copolymers of ethylene oxide and propylene oxide. These carboxyl modified polyethers have found commercial use in metal working fluids, in urethane foam processing, and in commercial development of modified polyethers.

Modification of polyethers by free radical grafting was apparently first disclosed as such in U.S. Pat. No. 3,418,354 of M. L. Wheeler, assigned to Union Carbide. This patent was concerned with grafting silicones to polyolefins, but also broadly disclosed graft copolymers of acrylonitrile, styrene, methacrylates, acrylates, acrylic acid, methacrylic acid and vinyl esters on poly(alkylene oxides).

In 1985, U.S. Pat. No. 4,528,334 of Knopf et al. disclosed the process for grafting acrylic acid onto ethylene oxide/propylene oxide copolymers. This patent covered polyethers broadly, including polytetramethylene glycol (PTMEG). U.S. Pat. Nos. 4,686,240 and 4,701,474 of Bailey disclosed acid-grafted polyethers useful as urethane foam modifiers and controllers. U.S. Pat. No. 4,764,541 discusses another useful class of acid-containing polyethers which find utility in such applications.

The present application combines the general utility of certain amine catalysts with the low volatility (vapor pressure of less than 0.01 mm Hg at 25° C.) of acid-grafted polyethers to yield novel catalysts for polyurethane foam manufacture, which do not suffer from the previously-discussed problems of volatile amine catalysts, and which may also offer additional advantages in foam processing.

SUMMARY OF THE INVENTION

The present invention relates broadly to a new class of aminoamide derivatives of polyethers. These materials are compositions of matter comprising at least one aminoamide derivative of at least one carboxyl group-containing polyether, this polyether derivative being represented by the general formula

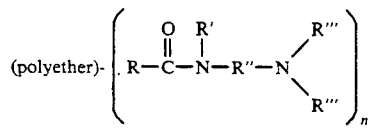

wherein

R is $CH_2$ when the aminoamide-containing moiety is located on an end of a polyether chain, and is $C_2H_4$ or $CH_2CH(CH_3)$ when the aminoamide-containing moiety is located along a polyether chain;

R' is H, an alkyl group of 2-4 carbon atoms, or $R''-N(R''')_2$;

R'' is alkylene of 2-6 carbon atoms, phenylene, or $C_2H_4N(CH_3)C_2H_4$;

R''' groups individually are alkyl groups of 1-18 carbon atoms or phenyl, or the R''' groups on a given nitrogen atom are 2-carbon alkylene moieties joined together by a divalent linking atom X to form a six-membered ring wherein X is $-O-$ or $>N-R^*$ and $R^*$ is H or an alkyl group of 1-18 carbon atoms; and n is 1-6.

The compounds of the invention function as nonvolatile amine catalysts for production of polyurethane foam, avoiding problems associated with the amine catalysts generally employed in polyurethane foams.

DETAILED DESCRIPTION OF THE INVENTION

The compounds of the invention are amine-containing amide derivatives of carboxylic acid-containing polyethers. They have nonvolatile (vapor pressure less than 0.01 mm Hg at 25° C.) polyether backbones to which are attached one or more groups containing an amide linkage and an amine. They are formed by reaction of acid-containing Polyethers with polyamines, one amino function of which reacts with a carboxylic acid group of the acid-containing polyether to form an amide linkage.

Polyethers of a very wide range of compositions and molecular weights may serve as the material upon which the compounds of the invention are based. Typically, the polyether's molecular weight will be in the range of from a few hundred to 15,000 or more. It will typically be a polymer of ethylene oxide, propylene oxide, or a block or random copolymer of these materials, but it may also be derived from other alkylene oxides such as butylene oxide or be a copolymer containing residues from such other alkylene oxides. When the products of the invention contain terminal hydroxyl groups they may be uncapped or capped with capping groups known to the art.

When the polyether is a copolymer of ethylene oxide and another alkylene oxide, the numbers of residues of each of these materials in the polyether are preferably from 2 to 200. When the polyether is a homopolymer with a repeating unit of $-(CH_2CH_2CH_2CH_2O)_x-$, the number of such repeating units is preferably 4 to 40.

Examples of polyethers which may be employed in forming the compounds of the invention are polyethylene glycols such as CARBOWAX®, polypropylene glycols, polyols such as the NIAX® polyols, including PPG-425, 1025, 2025 and 4025 (available from Arco), copolymers of ethylene oxide and propylene oxide such as UCON ® fluids, TERGITOLs, and polytetramethylene glycols, known commercially as TERATHANE ®.

There are many patent and other references, mostly in the area of polymer polyol and dispersion stabilizer art, which teach grafting of vinyl monomers onto polyethers. It is now generally accepted that substantially any known polymerizable vinyl monomer can be grafted onto a polyether, and procedures for accomplishing this are known.

One aspect of the present invention involves grafting onto a polyether one or more vinyl carboxylic acids. The preferred monomers for grafting are acrylic acid and methacrylic acid, though other unsaturated carboxylic acids may be employed. The resulting polyethers contain at least one lateral carboxylic acid-containing group. Since the polyether is generally a mixture of materials, the product of the reaction will be a mixture of carboxylic acid-grafted polyethers.

Acid grafted polyethers are prepared by direct grafting of the vinyl carboxylic acid to the polyether substrate. Typically, the vinyl carboxylic acid is added to the polyether which is being continually stirred at an elevated temperature. After completion of the reaction and cooling, residual monomer is removed under vacuum and the product isolated as a residue material See U.S. Pat. No. 4,528,334.

The acid grafted polyethers can contain from about one percent to about forty percent by weight of the acid-containing monomer residues, preferably three percent to forty percent by weight, and most preferably three to thirty percent by weight. Stated in other words, the number of grafted carboxylic acid-containing groups per polyether molecule, taken as an average based on the polyether mixture as a whole, is 0.1 to 6. This reflects the fact that in the preparation, not all polyether molecules necessarily become acid grafted.

Acid-tipped polyethers having terminal groups —OCH$_2$CO$_2$H are commercially-available as described in U.S. Pat. No. 4,764,541. These are converted to desired amide derivatives by known procedures.

The amines which are to be reacted with the acid-containing polyethers to form the compounds of the invention are polyamines which have at least one primary or secondary amino group which is capable of reacting with a carboxyl group to form an amide bond. They also contain at least one tertiary amino group which is capable of catalyzing the reaction between an isocyanate and a hydroxyl group to form a urethane linkage.

Examples of the amines used to prepare the amide derivatives of this invention include DMAPA, of Examples 1-5,

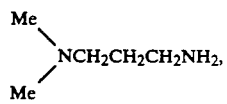

1-(2-aminoethyl)piperazine, of Examples 6 and 7,

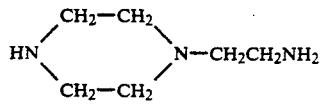

and 2-aminoethyl-N-morpholine, of Example 8,

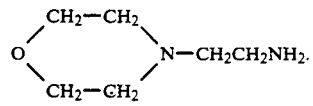

Other amines with utility in this invention are such material as:

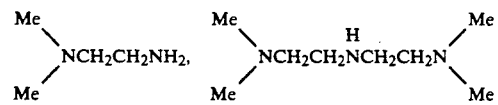

These materials are used as catalysts i manufacture of free rise foam and molded foams.

| GLOSSARY OF TERMS | |
| --- | --- |
| A-1 | A blend of 70% of Catalyst No. 1 in dipropylene glycol, sold by Union Carbide Corporation as NIAX catalyst A-1. |
| ASTM Test Methods | Physical Testing of Polyurethane Foams have been determined by standard testing procedures: A.S.T.M. Standard D-3574; comparable methods are described by the International Standards Organization: see ISO Standards 1798, 2439, 3386, 5999. |
| BHT | Butylated hydroxytoluene, a commercially available antioxidant. |
| Catalyst No. 1 | Bis(N,N-dimethylaminoethyl) ether, [(CH$_3$)$_2$N—CH$_2$CH$_2$]$_2$O, sold by Union Carbide Corporation. |
| CT-1006 | A commercial mold-release composition obtained from Chem-Trend. |
| D-19 or T-9 | Stannous Octoate |
| DABCO-120 | Dibutyltin Dilaurylmercaptide sold by Air Products. |
| DMAPA | N,N-dimethylaminopropylamine: (CH$_3$)$_2$N—CH$_2$CH$_2$CH$_2$—NH$_2$ |
| DMEA | N,N-dimethylaminoethanol (CH$_3$)$_2$N—CH$_2$CH$_2$OH |
| DMEE | N,N-dimethylaminoethoxyethanol (CH$_3$)$_2$NCH$_2$CH$_2$—O—CH$_2$CH$_2$OH |
| Fluid No. 1 | An anionically modified polyalkyleneglycol which is manufactured and sold by Union Carbide Corporation as EPML 483. |
| Fluid No. 2 | A fluid lubricant which is the ethylene oxide/propylene oxide mixed alkoxylate of butanol with a viscosity at 100° F. of 100 Saybolt Universal Seconds. |
| "HOT LOAD" | "Hot Load" is the indentation load deflection (IDF) at 25%, 50% and 65% determined on a molded foam eight minutes after pouring into the mold and demolding at the normal time, usually three to five minutes. "Hot Load" is taken as a measure of foam "green strength" or demoldability and is related to the degree of cure of the foam at demold. |
| IFD 65/25 | The ratio of the indentation load deflection (IDF) of a foam sample at 25% indentation and at 65% indentation. This ratio is taken as the "support factor" sometimes called a "comfort factor" in foams used for cushioning. |
| L562 | A non-hydrolyzable silicone surfactant sold by Union Carbide Corporation for use in slab urethane foams. |

GLOSSARY OF TERMS -continued

| | |
|---|---|
| L6202 | A hydrolyzable silicone surfactant sold by Union Carbide Corporation for use in slab foams. |
| Lupersol 101 | A free-radical polymerization initiator sold by Pennwalt Corp., 2,5-dimethyl-2,5-bis(t-butyl-peroxy)hexane. |
| php | parts per hundred of polyol. |
| Polyethylene Glycols | Polymers of ethylene oxide which are diols or triols having molecular weights in the range of about 100 to about 1000 or higher. Generally liquids or waxy solids. |
| Polyol No. 1 | A propylene oxide triol capped with ethylene oxide, with a hydroxyl number of about 36 mg. KOH/g. |
| Polyol No 2 | An alkylene oxide triol which is the ethylene oxide/propylene oxide adduct of glycerine capped with propylene oxide to a hydroxyl number of 58 mg. KOH/g., with a total ethylene oxide content of about 10 percent. |
| Polyol No. 3 | An alkylene oxide triol which is an ethylene oxide/propylene oxide adduct which is tipped with propylene oxide and has an ethylene oxide content of about 10 percent by weight and a hydroxyl number of 52 mg. KOH/g. |
| Polyol No. 4 | A polyalkylene oxide triol produced by the reaction of propylene oxide with glycerine, then end capped with ethylene oxide to a hydroxyl number of about 36, and containing about 16 percent by weight of ethylene oxide. |
| Polyol No. 5 | A polymer polyol which is a 28% solids dispersion of acrylonitrile/styrene copolymer in Polyol No. 4, with a hydroxyl number of about 28 mg. KOH/g. |
| Polyol No. 6 | A polymer polyol which is a 45% solids dispersion of acrylonitrile/styrene copolymer in a blend of polyether triols, with a hydroxyl number of about 27 mg. KOH/g. |
| Polyol No. 8 | A 45 percent by weight polymer polyol based on a propylene oxide tipped ethylene oxide/propylene oxide triol and acrylonitrile/styrene copolymer blended for use in high comfort slab polyurethane foam,. manufactured and sold by Arco. |
| Polyol No. 9 | An anionic functionally modified polyalkylene glycol manufactured and sold by Union Carbide Corporation. It is specially designed for use in preparing water-borne polyurethane coatings and adhesives. |
| Polypropylene Glycols | Liquid polymers of propylene oxide which are diols or tiols with molecular weights ranging from about 100 to 15,000 or more. |
| PPG 1450 | Polypropylene glycol with a molecular weight of about 1500. |
| PPG 15000 | Polypropylene glycol with a molecular weight of about 15,000. |
| SURFACTANT NO. 1 | A nonionic surfactant which is the polyethoxylate of a linear alcohol and an alkoxypolyethoxyethanol, manufactured and sold by Union Carbide Corporation as Tergitol ® 24-L-60. |
| TERATHANE ® | Tradename for linear polymers of tetrahydrofuran which are diols |

GLOSSARY OF TERMS -continued

| | |
|---|---|
| | manufactured and sold by E. I. duPont de Nemours and Company, Inc. |
| VAZO ("AIBN") | Free radical polymerization initiator, azobisisobutyronitrile, sold by duPont. |
| Y-10366 | A silicone surfactant sold by Union Carbide Corporation for use in high resiliance polyurethane foams |

The derivatives which have been evaluated most extensively in the experimental work below are condensation products of N,N-dimethylaminopropylamine with acrylic acid grafted polyethers. The products have shown promise as non-fugitive amine catalysts in urethanes as shown in the Examples.

EXAMPLES OF THE INVENTION

Preparation of Amide Derivatives of Polyethers

EXAMPLES 1-8

Grafting of acrylic acid onto polyethers is described in U.S. Pat. No. 4,528,334, and appears to be relatively non-selective between oxyethyl and oxypropyl polyether segments. The preferred free radical grafting initiators are generally those which give peroxy radicals which are efficient hydrogen abstractors from the polyoxyalkylene substrate, eg. t-butyl perbenzoate or peroxyalkylate esters (decanoyl peroxide or LUPERSOL rather than the "azo" initiators such as "AIBNB" ("VAZO") preferred in the manufacture of polymer polyols).

The condensation of DMAPA with acrylic acid grafted polyether is accomplished in a batch reaction in a solvent such as toluene or ethylbenzene, catalyzed by a small amount of p-toluenesulfonic acid. The reaction is run at reflux temperature with about a ten percent excess of amine and is driven by removal of water. In the laboratory, a Dean Stark trap is used for this purpose. In the laboratory, the reaction time is about 48 hours for a 10 percent acrylic acid grafted polyether in toluene. Somewhat longer reaction times are required for higher grafting levels. The higher reflux temperature of ethylbenzene will reduce the reaction time.

The water layer is periodically removed from the Dean Stark trap and the amount removed is recorded. When the amount of water accumulating becomes small, the reaction is stripped of solvent, which is typically toluene or ethylbenzene, simultaneously removing the last of the water. The residue products are characterized by acid number, total alkalinity, and viscosity, and analyzed by GC, NMR, and for elemental nitrogen. After the solvent is stripped off, 500 ppm of BHT antioxidant is added.

EXAMPLE 1

Preparation of the poly(t-amine) from Fluid No. 1 and N,N-dimethylaminopropylamine (DMAPA)

Using the above-described procedure and the amounts of materials listed below, the desired product was formed, and characterized as shown.

| Material | Amount (grams) |
|---|---|
| Fluid No. 1 (acid number = 74.08 mg. KOH/g) | 1000 |

| -continued | |
|---|---|
| DMAPA | 164.4 |
| toluene | 1600 |
| p-toluenesulfonic acid | 0.4 |
| Product: | |
| Appearance | dark, brown liquid |
| Acid number | 8.39 mg. KOH/g. |
| Total Alkalinity | 1.25 meq./g. |
| Viscosity, cks. @ 25° C. | 3093 |
| % N (elemental) | 3.28 |
| C13 NMR | amide carbonyl identified. |

The infrared spectra of the product, compared with the starting carboxylated polyether, showed the shift in absorption from the characteristic carboxyl absorption at about 1720 cm$^{-1}$ to the amide absorption at about 1650 cm$^{-1}$.

EXAMPLE 2

Preparation of the poly(t-amine) from acrylic acid grafted Surfactant No. 1 and DMAPA Using the above-described procedure and the amounts of materials listed below, the desired product was formed, and characterized as shown.

| Material | Amount (grams) |
|---|---|
| Acrylic acid grafted surfactant No. 1 (acid number = 65.6 mg. KOH/g) | 124 |
| DMAPA | 20.55 |
| toluene | 200 |
| p-toluenesulfonic acid | 0.05 |
| Product: | |
| Appearance | dark, brown liquid |
| Acid Number | 16.31 mg. KOH/g. |
| Total Alkalinity | 1.20 meq./g. |
| Viscosity, cks. @ 25° C. | 206 |
| % N (elemental) | 3.04 |

EXAMPLE 3

Preparation of poly(t-amine) from acrylic acid grafted polyol No. 4 and DMAPA

Using the above-described procedure and the amounts of materials listed below, the desired product was formed, and characterized as shown.

| Material | Amount (grams) |
|---|---|
| acrylic acid grafted polyol No. 4 (acid number = 57.68 mg. KOH/g) | 125 |
| DMAPA | 19.65 |
| ethylbenzene | 174.1 |
| p-toluenesulfonic acid | 0.15 |
| reflux temperature, 139° C. | |
| Product: | |
| Appearance | dark brown liquid |
| acid number | 3.03 mg. KOH/g. |

The infrared spectra of the product, compared with the starting carboxylated polyether, showed the shift in absorption from the characteristic carboxyl absorption at about 1720 cm$^{-1}$ to the amide absorption at about 1650 cm$^{-1}$.

This product was submitted for evaluation as an amine catalyst.

EXAMPLE 4

Preparation of poly(t-amine) from about a 20 percent acrylic acid grafted Fluid No. 2 and DMAPA Using the above-described procedure and the amounts of materials listed below, the desired product was formed, and characterized as shown.

| Material | Amount (grams) |
|---|---|
| acrylic acid grafted Fluid No. 2 (acid number = 105.0 mg. KOH/g.; hydroxyl number = 59.47 mg. KOH/g; viscosity at 25° C. = 650 cps) | 125 |
| DMAPA | 23.86 |
| ethylbenzene | 174.1 |
| p-toluenesulfonic acid | 0.15 |

After stripping, the product had an acid number of 21.28 mg. KOH/g. This result indicated that the condensation reaction had not progressed as far as desirable. The residue product was diluted with 174 grams of ethylbenzene, 10 grams of DMAPA was added together with 0.15 grams of p-toluenesulfonic acid. The reaction was continued at reflux for 24 hours and the reaction mixture then stripped. A dark brown liquid was taken as a residue product.

| Product: | |
|---|---|
| Appearance | dark brown liquid |
| acid number | 7.09 mg. KOH/g. |
| total alkalinity | 1.70 meq./g. |
| hydroxyl number, calculated from the OH# of the acrylic acid grafted fluid | 49.2 mg. KOH/g. |
| hydroxyl number, calculated from the OH# of Fluid No. 2 assuming no loss of functionality | 64.1 mg. KOH/g. |

EXAMPLE 5

Preparation of poly(t-amine) from about 30 percent acrylic acid grafted Fluid No. 2 and DMAPA Using the above-described procedure and the amounts of materials listed below, the desired product was formed, and characterized as shown.

| Material | Amount (grams) |
|---|---|
| acrylic acid grafted Fluid No. 2 (acid number = 169.3 mg. KOH/g.; hydroxyl number = 28.05 mg. KOH/g; viscosity at 25° C. = 10,800 cps) | 133.3 |
| DMAPA | 45.11 |
| ethylbenzene | 185.5 |
| p-toluenesulfonic acid | 0.16 |

After 48 hours, the reaction was stripped of ethylbenzene and the residue product taken.

| Product: | |
|---|---|
| acid number | 14.85 mg. KOH/g. |
| total alkalinity | 2.20 meq./g. |
| hydroxyl Number, calculated from the OH# of the acrylic acid grafted fluid | 21.2 mg. KOH/g |
| hydroxyl Number, calculated from the OH# of Fluid No. 2 assuming no loss of functionality | 64.1 mg. KOH/g |

EXAMPLE 6

Preparation of the Condensation Product of Polyol No. 4 grafted with 10% Acrylic Acid and N-(2-aminoethyl)piperazine The materials used in this laboratory preparation were Polyol No. 4, t-butyl peroxybenzoate, glacial acrylic acid, 1-(2-aminoethyl)-piperazine, p-toluenesulfonic acid and ethylbenzene. Into a 4-necked, round-bottom Morton Flask equipped with a mechanical stirrer, water cooled condenser, thermometer with THERMOWATCH temperature controller, dropping funnel and nitrogen purge, there was poured 343 grams of Polyol No. 4. With nitrogen purge and stirring, the polyol was heated to 150° C. Using the dropping funnel, a solution of one gram of tertiary-butyl perbenzoate in 21 grams of Polyol No. 4 was added to the Polyol in the stirred flask at a rate of about one gram per minute. As soon as this feed was completed, a second solution was fed at a similar rate to the reaction flask. The second feed was a solution of one gram of tertiary-butyl perbenzoate and 50 grams of acrylic acid in 86 grams of Polyol No. 4. After this second addition was complete, the reaction mixture was stirred under nitrogen at 150° C. for an hour.

After an hour, the reaction mixture was sampled and found to have an acid number of 63.44 mg. KOH/g. A dry ice condenser and cold traps were attached to the reaction flask and the reaction mixture was stripped under vacuum. After stripping the acid number of the product was 57.64 mg. KOH/g. The product weight was 485.1 grams. The weight of the samples removed for analysis was 7.1 grams and the total amount of liquid stripped off and trapped was 10.6 grams.

A similar laboratory arrangement to that used in the first step was used in the second step in order to condense the grafted Polyol prepared with 1-(2-aminoethyl)-piperazine. However, in the second step, a Dean Stark trap with water cooled condenser was used in place of the simple condenser in step one. Into the reaction flask, there were weighed 125 grams of acrylic acid grafted polyol, 24.9 grams of 1-(2-aminoethyl)piperazine, 0.15 grams of p-toluenesulfonic acid and 173.5 grams of ethyl benzene. The reaction flask was heated to the reflux temperature, about 140° C. Water accumulating in the Dean Stark trap was periodically removed over a period of about 10 hours. After this time, the reaction mixture was stripped under vacuum. 145 grams of product was recovered as a residue product. This Product had an acid number of 2.62 mg. KOH/g.

EXAMPLE 7

Preparation of the Amide Derivative of Carboxylated Polyol No. 3 and 1-(2-aminoethyl)piperazine Polyol No. 3 was grafted with five percent by weight of acrylic acid using t-butylperoxybenzoate as the free radical initiator. The product had a viscosity of 1154 centistokes at 25° C. and an acid number of 29.56 mg. KOH/g.

250 grams of this acrylic acid grafted Polyol No. 3 were charged, together with 17.02 grams of 1-(2-aminoethyl)piperazine, 0.15 g. of p-toluenesulfonic acid and 344.5 grams of ethyl benzene, to a one-liter, 4-necked flask equipped with mechanical stirrer, thermometer with THERMOWATCH temperature regulator, Dean Stark trap and water cooled condenser and a nitrogen purge. The temperature was raised to reflux, about 141° C. Over a period of about 15 hours, 3 ml. of water was collected in the Dean Stark trap The reaction mixture was then stripped of ethylbenzene. 265.8 grams of product was obtained. The product was analyzed:

| Acid Number | 2.91 mg. KOH/g. |
|---|---|
| Alkalinity | 0.842 meq./g. |
| Viscosity | 2,466 cks. @ 25° C. |
| Nitrogen, elemental analysis: | 1.79% |
| C13 NMR | amide identified |

EXAMPLE 8

Preparation of the Condensation Product of Polyol No. 4 Grafted with 10% of Acrylic Acid and N-(2-aminoethyl)morpholine A 250 ml round bottom flask equipped with mechanical stirrer, Dean Stark Trap, condenser and thermometer with THERMOWATCH temperature controller was charged with 50 grams of 10 percent acrylic acid grafted Polyol No. 4, 9 grams of 4-(2-aminoethyl)-morpholine, 75 grams of o-xylene and 0.1 grams of p-toluene sulfonic acid. The reaction mixture was heated at reflux. Reaction was allowed to proceed at reflux for about 14 hours. About 1.5 ml. of water was collected in the Dean Stark trap. The reaction was then stripped under vacuum. 55.2 grams of product was recovered.

The product had a total alkalinity, measured by a MEMOTITRATOR, of 1.196 meq./g.

EXAMPLES A1-A22

Use of t-Amine/Amide Derivatives of Polyethers as Non-Fugitive Urethane Foams Catalysts Examples of acrylic acid grafted polyethers which are subsequently condensed to form t-amine substituted polyethers:
1) Fluid No. 1
2) Acrylic acid grafted Surfactant No. 1
3) acrylic acid grafted Polyols No. 3 and No. 4.
4) Fluid No. 2
5) PPG-15000 or PPG-1450
6) CARBOWAX 1500

The amines used to form the corresponding amides with the carboxylated polyethers include DMAPA (N,N-dimethylaminopropylamine), 1-(2-aminoethyl)-piperazine and (2-aminoethyl)-N-morpholine.

In all tables below dealing with Examples A1—A22, the amounts of ingredients are given in parts per hundred of polyol.

Examples A1 and A4 are comparative examples using Catalyst A-1. Examples A2, A3, and A5 use non-fugitive catalysts which are the subject of this invention. The comparison is made by noting the "cream time" and "rise time" of the foams, all of which were good quality, flexible, water-blown urethane foams.

EXAMPLES A1-A5

| | SLAB STOCK FOAM FORMULATIONS | | | | |
|---|---|---|---|---|---|
| FOAMS: | A1. | A2. | A3. | A4. | A5. |
| Polyol No. 6 | 100 php. | 100 php. | 100 php. | — | — |
| Polyol No. 2 | — | — | — | 100 php. | 100 php. |
| Water | 2.3 | 2.3 | 2.3 | 3.5 | 3.5 |
| D-19 | 0.11 | 0.11 | 0.11 | 0.15 | 0.15 |

-continued

| SLAB STOCK FOAM FORMULATIONS | | | | | |
|---|---|---|---|---|---|
| FOAMS: | A1. | A2. | A3. | A4. | A5. |
| L6202 | 0.7 | 0.7 | 0.7 | — | — |
| L-562 | — | — | — | 1.0 | 1.0 |
| TDI | 30.38 | 30.38 | 30.38 | 47.1 | 47.1 |
| A-1* | 0.03 | — | — | 0.08 | — |
| Catalyst from Example 1* | — | 0.39 | — | — | — |
| Catalyst from Example 2* | — | — | 0.43 | — | — |
| Catalyst from Example 3** | — | — | — | — | 1.0 |
| Cream Time, sec. | 11 | 13 | 13 | 9 | 10 |
| Rise Time, sec. | 125 | 127 | 128 | 120 | 120 |

Footnotes for Table of examples A1–A5
*Formulations of foams no. 2 and 3 were adjusted to the same t-amine equivalents as foam no. 1.
**Formulation of foam no. 5 was adjusted to the same t-amine equivalents as foam no. 4.

EXAMPLES A6–A7

Use of Non-Fugitive Amine Catalysts in Molded Urethane Foams

| Molded Foam Formulations: | | |
|---|---|---|
|  | A6. | A7. |
| Polyol No. 4 | 65 php. | 65 php. |
| Polyol No. 5 | 35 | 35 |
| Water | 4.15 | 4.15 |
| DEOA | 1.5 | 1.5 |
| t-amine, Example 1. | 0.13 | 0.13 |
| M&T 120 | 0.007 | 0.007 |
| Y-10366 | 1.4 | 1.4 |
| TDI @ 104 Index | 51.28 | 51.28 |
| Cream Time, sec. | 7 | 6 |
| Extrusion Time, "pop-up", sec. | 32 | 32 |
| Maximum Temperature of the foam in the mold: | 143° C. | 143° C. |

In both Examples 6 and 7, stable, full molded polyurethane foams were obtained.

EXAMPLES A8–A10

Example 8 is a comparative example using the commercial amine catalyst, A-1. These are slab (free-rise) foams. These formulations contain the same amount of tertiary amine on a contained t-amine equivalent basis.

|  | A8 | A9 | A10 |
|---|---|---|---|
| Polyol No. 6 | 100 php. | 100 php. | 100 php. |
| Water | 2.3 | 2.3 | 2.3 |
| D-19 | 0.11 | 0.11 | 0.11 |
| L-6202 | 0.7 | 0.7 | 0.7 |
| TDI @ 115 Index | 30.38 | 30.38 | 30.38 |
| A-1 | 0.03 | | |
| Amine of Example 1 | | 0.39 | |
| Amine of Example 2 | | | 0.43 |
| Room Temperature, 72° F. | | | |
| Polyol Temperature, 95° F. | | | |
| Relative Humidity, 42% | | | |
| Cream Time seconds: | 11 | 13 | 13 |
| Rise Time, seconds | 125 | 127 | 128 |
| Foam Cure: | good | good | good |
| Foam Properties: | | | |
| Density, lb./cu.ft. | 2.34 | 2.37 | 2.34 |
| Porosity, CFM | 26.6 | 48.2 | 32.0 |
| IFD | | | |
| 25% | 134.3 | 128.3 | 129.3 |
| 65% | 268 | 256 | 259.5 |
| IFD 25% return | 81.3 | 60.8 | 77.8 |
| Return Value | 60.5 | 60.8 | 60.2 |
| IFD 65/25 | 2.0 | 2.0 | 2.0 |
| Tensile Strength, psi. | 28.2 | 27.2 | 28.9 |
| Elongation, %6 | 66.3 | 61.4 | 66.4 |
| Tear, lb./in. | 2.8 | 2.5 | 2.6 |

This table shows that the amine catalysts of the invention perform substantially the same as the control so long as equivalent amounts of amine are used in the formulation, while offering the benefits of being non-fugitive materials.

EXAMPLES A11–A15

A comparison of foams made with known tertiary-amine catalysts and the non-fugitive catalysts which are the subject of this application was made. Examples A11–A14 are comparative examples not part of the invention. The formulations have been adjusted to give equal foam rise times for these free-rise (slab) foams and closely equivalent properties. On this basis, it is possible to compare the effectiveness of the new non-fugitive catalysts on a contained t-amine basis.

Foam formulations were designed to give a slab foam rise time of 112 seconds:

| Polyol No. 2 | 100 php. |
|---|---|
| Water | 3.5 |
| Amine Catalyst | varied—see Table A Below |
| T-9 | 0.15 |
| L-562 | 1.0 |
| TDI @ 110 Index | 47.1 |
| Cream Time, Sec. | 8 |
| Rise Time, Sec. | 112 |
| Foam Properties: | |
| Density, lb./cu.ft. | 1.8 |
| Porosity, CFM | 30 |
| IFD | |
| 25%, psi. | 45 |
| 65%, psi. | 85 |
| IFD 65/25 | 1.9 |
| Tensile, psi. | 13 |
| Elongation, % | 130 |
| Tear, lb./in. | 1.2 |

TABLE A

| COMPARISON OF t-AMINE CATALYSTS | | | | |
|---|---|---|---|---|
| Examples: | Amine: | % contained t-amine nitrogen: | Amount of Amine Used: | Amount of t-amine N in Formulation |
| A11. | Catalyst No. 1 | 17.5 | 0.09 | 0.0158 |
| A12. | DMEE | 10.5 | 0.22 | 0.0231 |
| A13. | DMEA | 15.7 | 0.33 | 0.0518 |
| A14. | DMAPA | 13.7 | 0.24 | 0.0328 |
| A15. | Amine from Example 3 | 1.76 | 1.68 | 0.0296 |

This table shows again that the nonfugitive amine catalysts of the invention perform substantially the same as prior art amine catalysts so long as equivalent amounts of amine are used.

EXAMPLES A16–A20

Preparation of water-blown urethane foams using non-fugitive catalysts based on Fluid No. 2 and prepared according to Examples 4 and 5. Example 16 is a comparative example using Catalyst A1.

|  | Foam Formulations: | | | | |
|---|---|---|---|---|---|
|  | A16. | A17. | A18 | A19. | A20. |
| Polyol No. 2 | 100 php. | 100 php. | 100 php. | 100 php. | 100 php |
| Water | 4.5 | 4.5 | 4.5 | 4.5 | 4.5 |
| Catalyst No. 1 | 0.02 | — | — | — | — |
| Amine from Example 4 | — | 0.25 | 0.35 | — | — |
| Amine from Example 5 | — | — | — | 0.15 | 0.20 |
| T-9 | 0.16 | 0.16 | 0.20 | 0.20 | 0.20 |
| L-562 | 1.1 | 1.1 | 1.1 | 1.1 | 1.1 |
| TDI @ Index 110 | 57.58 | 57.58 | 57.58 | 57.58 | 57.58 |
| Room Temp., °F. | 72 | 72 | 72 | 72 | 72 |
| Polyol, °F. | 72 | 72 | 72 | 72 | 72 |
| Rel Humid., % | 41 | 41 | 41 | 41 | 41 |
| Cream Time, sec. | 11 | 12 | 11 | 11 | 11 |
| Rise Time, sec. | 112 | 118 | 105 | 108 | 104 |
| Foam Properties: | | | | | |
| Density, lb./ft.3 | 1.5 | 1.5 | 1.5 | 1.5 | 1.43 |
| Porosity, CFM | 48.2 | 62.2 | 42.8 | 18.5 | 42.8 |
| IFD, | | | | | |
| 25% | 35.5 | 38.0 | 44.0 | 42.8 | 37.3 |
| 65% | 79.3 | 81.8 | 86.8 | 87.0 | 81.3 |
| IFD 25% Return Value | 21.5 | 23.5 | 27.5 | 26.3 | 22.8 |
| Ret. Val. | 60.6 | 61.8 | 62.5 | 61.4 | 61.1 |
| IFD 65/25 | 2.2 | 2.2 | 2.0 | 2.0 | 2.2 |
| Tensile, psi. | 15.1 | 14.6 | 14.1 | 16.0 | 15.7 |
| Elong., % | 267 | 202 | 169.6 | 208.2 | 228.3 |
| Tear, lb./in. | 2.3 | 2.2 | 1.7 | 2.3 | 2.2 |
| Compression set, 90% | 9.3 | 5.6 | 4.7 | 5.7 | 8.1 |
| Humid Age Compression set 75 | 7.8 | 6.3 | 4.9 | 5.7 | 7.8 |
| Wet Set 50 | 17.9 | 7.4 | 4.8 | 9.8 | 7.2 |

This table shows that the nonfugitive amine catalysts of the invention perform similarly to the control. The data suggest the compounds of the invention improve the compression set properties of the foam.

EXAMPLE A21

Use of the Amide Derivative of Polyol No. 3, Prepared According to Example 7, in Urethane Foam Molded and slab foams were made in the laboratory using the Amide Derivative Polyol to see if foam processing was adversely influenced by presence of this polyol which has both tertiary-amine and secondary-amine functionality. No substantial effect was observed.

| Molded Foam*: | | Slab Foam**: | |
|---|---|---|---|
| Polyol No. 4 | 65 php. | Polyol No. 6 | 100 php. |
| Polyol No. 5 | 35 | Example 8, amide | 5 |
| Example 7, amine/amide | 5 | Water | 2.3 |
|  |  | A-1 | 0.03 |
| Water | 4.15 | D-19 | 0.11 |
| DEOA | 1.5 | L-6202 | 0.7 |
| A-1 | 0.13 | TDI @ 115 Index | 30.71 |
| A-33 | 0.4 | Cream Time, seconds | 12 |
| M&T 120 | 0.007 | Rise Time, seconds | 75 |
| Y-10366 | 1.4 | | |
| TDI @ 105 Index | 51.26 | | |
| Cream Time, seconds | 10 | | |
| Exit Time, seconds | 19 | | |

| Molded Foam*: | Slab Foam**: |
|---|---|
| Full pad yes | |

*Compare with A6, A7. Example 7 catalyst was somewhat faster but gave acceptable foam.
**Compare with A9, A10. Example 8 catalyst gives the same cream time and actually improves the rise time.

EXAMPLE A22

Use of the Amide Derivative of Polyol No. 4, prepared according to Example 8, in Urethane Foam

| Polyol No. 2 | 100 php. | 100 php. |
|---|---|---|
| A-1 | 0.07 | — |
| T-9 | 0.18 | 0.18 |
| Example 8, Amide/Amine* | — | 0.61 |
| Water | 4.0 | 4.0 |
| L-6202 | 1.0 | 1.0 |
| TDI @ 110 Index | 52.86 | 52.86 |
| Blowoff Observed, sec. | 96 | 116 |

*The experimental foam containing the amide/amine from Example 8 was a tight foam.

Other embodiments of the invention will be apparent to the skilled in the art from a consideration of this specification or practice of the invention disclosed herein. It is intended that the specification and examples be considered as exemplary only, with the true scope and spirit of the invention being indicated by the following claims.

It is claimed:

1. In a process for making polyurethane foam by reacting and foaming a reaction mixture comprising a polyol, an organic polyisocyanate, a catalyst, and a blowing agent, the improvement which comprises using as the catalyst a composition of matter comprising at least one aminoamide derivative of at least one carboxyl group containing polyether, said polyether derivative being represented by the general formula:

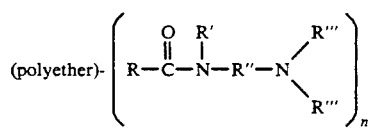

wherein
R is $CH_2$ when the aminoamide-containing moiety is located on an end of polyether chain, and is $C_2H_4$ or $CH_2CH(CH_3)$ when the aminoamide-containing moiety is located along a polyether chain;
R' is H, an alkyl group of 2–4 carbon atoms, or $R''-N(R''')_2$;
R" is alkylene of 2–6 carbon atoms, phenylene or $C_2H_4N(CH_3)C_2H_4$;
R''' groups individually are alkyl groups of 1–18 carbon atoms or phenyl, or the R''' groups on a given nitrogen atom are 2-carbon alkylene moieties joined together by a divalent linking atom X to form a six-membered ring wherein X is —O— or >N—R*, and R* is H or an alkyl group of 1–18 carbon atoms; and
n is 1–6.

2. The process of claim 1 wherein said at least one carboxylic group-containing polyether comprises at least one terminal carboxylic acid-containing group.

3. The process of claim 1 wherein said at least one carboxyl group-containing polyether comprises at least one lateral carboxylic acid-containing group.

4. the process of claim 1 wherein said at lease one carboxylic group-containing polyether is a mixture of carboxylic acid-grafted polyethers.

5. The process of claim 4 wherein the number of grafted carboxylic acid-containing groups per polyether molecule, taken as an average based on the polyether mixture as a whole, is 0.1 to 6.

6. The process of claim 4 wherein the grafted carboxylic acid-containing groups are residues of acrylic acid or methacrylic acid.

7. The process of claim 1 wherein the polyether portion of said polyether derivative comprises a homopolymer of ethylene oxide, propylene oxide, a butylene oxide, or a copolymer of two of these materials.

8. The process of claim 1 wherein the amine-containing portion

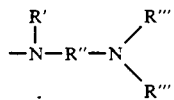

of said aminoamide polyether derivative is selected from the group consisting of

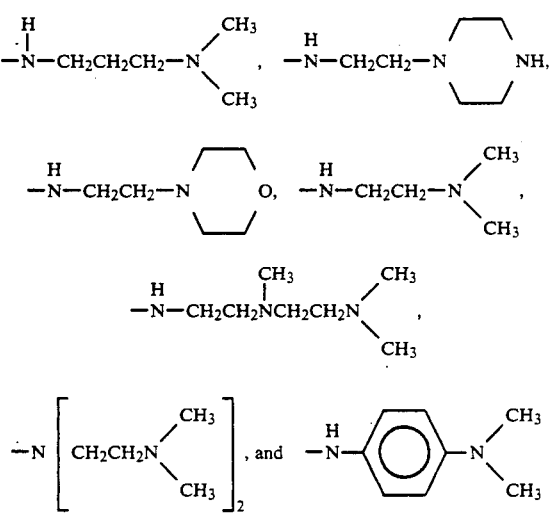

* * * * *